Feb. 14, 1928.

J. F. GAYLORD

CLUTCH

Filed June 26, 1926

1,659,525

2 Sheets-Sheet 1

Inventor
John F. Gaylord

By

Attorney

Feb. 14, 1928.
J. F. GAYLORD
1,659,525
CLUTCH
Filed June 26, 1926
2 Sheets-Sheet 2
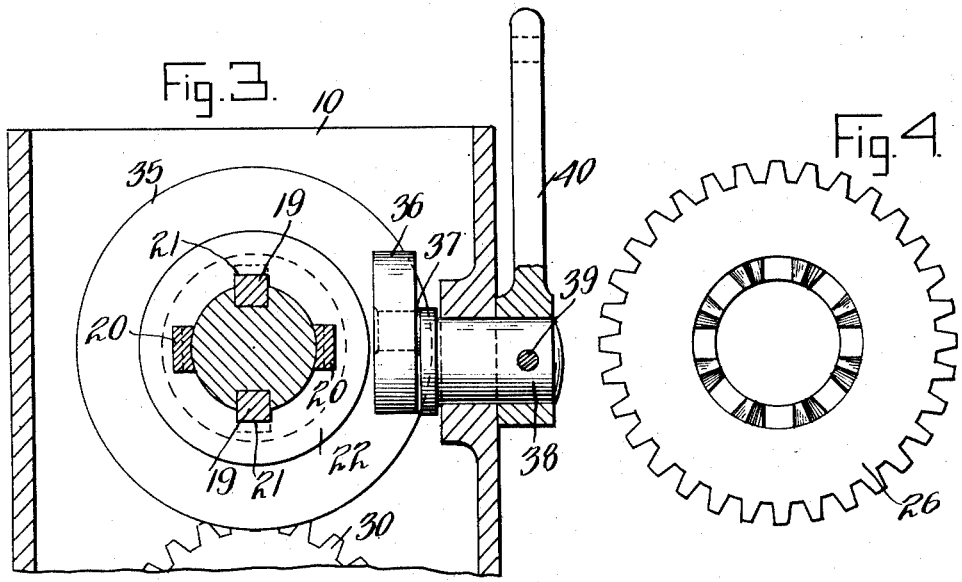
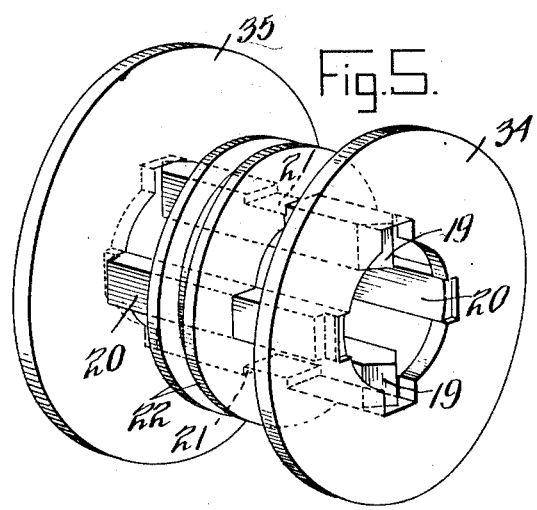
Inventor
John F. Gaylord
By
E. W. Bradford
Attorney Patented Feb. 14, 1928.

1,659,525

UNITED STATES PATENT OFFICE.

JOHN F. GAYLORD, OF NORFOLK, VIRGINIA.

CLUTCH.

Application filed June 26, 1926. Serial No. 118,698.

My invention relates to clutches for variable speed transmissions for automobiles or the like and particularly to that type of transmission in which the gears are constantly engaged.

It is an object of the invention to provide a device of this character which is more simple and durable in construction and efficient in operation and in which the operation of changing gears may be accomplished with the least effort no matter whether the shifting operation is to a lower or higher gear.

I accomplish the foregoing objects by providing a disk splined to a driven shaft with means for sliding the same along the shaft into frictional engagement with the surface of a gear to which the shaft is to be clutched, such frictional contact between the disk and the face of the gear causing them to rotate at substantially the same speed to permit the clutching action to be easily accomplished.

Figure 1:
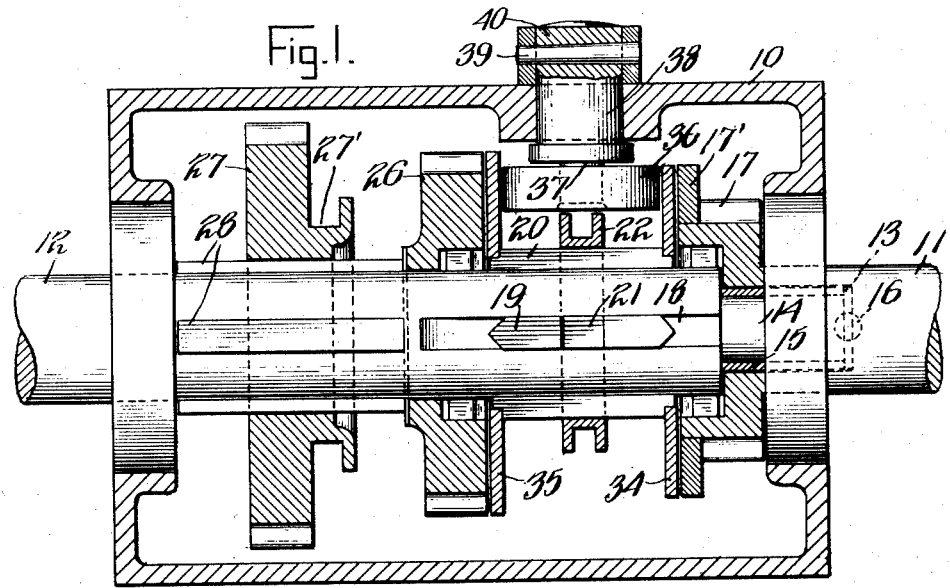
Figure 2:
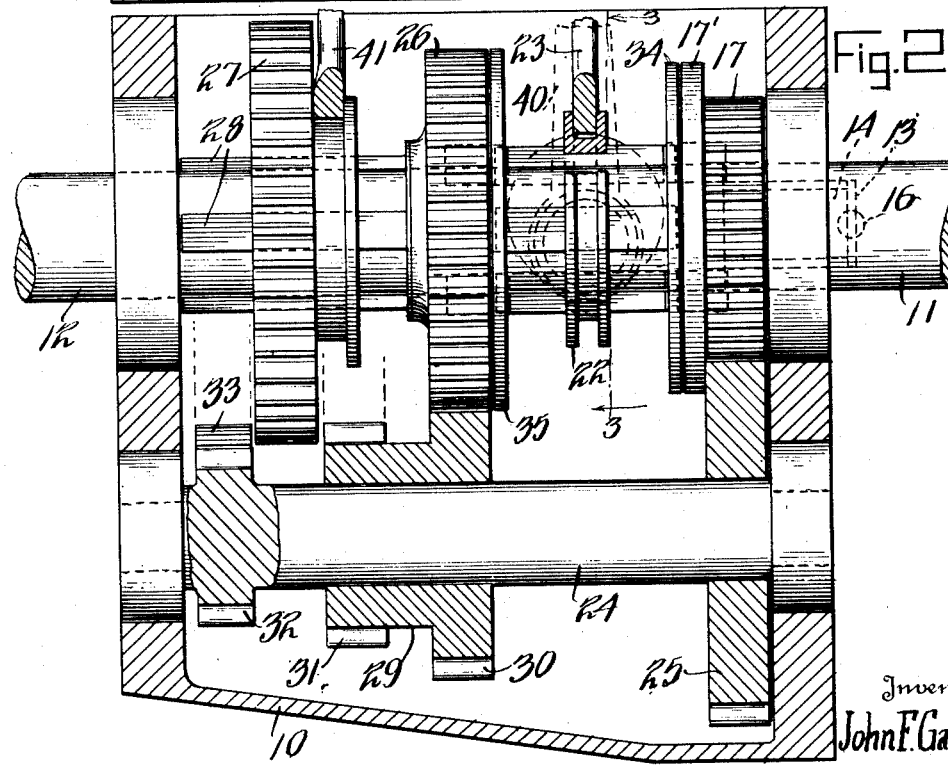

Referring to the accompanying drawings which are made a part hereof and on which similar reference characters indicate similar parts, Figure 1 is a horizontal section showing the application of my invention, Figure 2, a vertical section through the casing with the parts in elevation, Figure 3, a section on line 3—3 of Figure 2, Figure 4, an end elevation of one of the gears, and Figure 5, a detail perspective.

In the drawings reference character 10 indicates a transmission housing in which are mounted a driving shaft 11 and a driven shaft 12, said shaft 11 being provided with a recess 13 in its end into which the reduced end 14 of the shaft 12 extends. A bearing sleeve 15 is preferably provided about the reduced end 14 in the recess 13. Between the bottom of the socket and the reduced end is provided a bearing element or ball 16. A gear 17 is provided on the extremity of the driving shaft within the housing 10 said gear either being formed integral with said shaft or fixed thereon for positive rotation therewith. The driven shaft 12 is provided adjacent its end with slots 18 extending longitudinally of the same and in which are disposed a plurality of diametrically opposed pins 19. Pins 20 are also disposed in diametrically opposed relation between the pins 19, each of the pins 19 having its ends tapered to a point and having a depression or slot 21 adjacent its center in which is disposed an annular clutch collar 22 adapted to be shifted by a clutch fork 23 for operating the clutch or engaging pins to move them simultaneously in either direction in the slots in which they are mounted. The gear 17 on the end of the driving shaft extends a slight distance over the end of the driven shaft and said gear is provided with recesses for the reception of the ends of the clutch pins 19. The surface of the gear between said recesses is preferably also tapered so that the clutch pins may readily enter the recesses in the gear and clutch the shaft 12, having the slots in which the clutch pins are disposed, to the gear 17 on the driving shaft 11 and cause them to rotate simultaneously and therefore effect a direct drive between the driving and the driven shafts.

An auxiliary or stub shaft 24 is disposed in the housing 10 in parallel relation to the driving and driven shafts and has fixed thereon a gear 25 which is constantly in mesh with the gear 17 fixed on the driving shaft and by means of which the auxiliary or stub shaft will be constantly driven from the driving shaft. In order to produce an indirect drive or a drive by means of which the ratio between the driving and driven shafts is varied I provide a loose gear 26, of substantially the same size as the gear 25, on the driven shaft adjacent to the inner ends of the slots 18, said gear 26 having recesses therein corresponding to the recesses in the gear 17 and adapted to receive the ends of the clutch pins 19 for clutching said gear to the driven shaft. Another gear 27, slightly larger in size than the gear 26, is slidably mounted on said shaft and is prevented from rotation by means of splines 28, said gear being provided with a collar 27' for engagement by an operating fork 41. A smaller gear member 29 having spaced pairs of gear teeth of different sizes is fixed on said stub shaft, the larger of said pairs of gear teeth 30 being in mesh with the gear 26 loosely mounted on the driven shaft and adapted to drive said driven shaft through the gear 26 when the clutch collar 22 is moved to the left to clutch said gear to the shaft upon which it is mounted. The smaller set of teeth 31 on said gear member is adapted to be engaged by the gear 27 for producing a different relative speed between the shafts. An additional gear 32 of slightly smaller size than the gear 31 is mounted on said shaft and an intermediate gear 33 of a still smaller size is mounted in engagement with said last-mentioned gear, said intermediate gear being adapted to be engaged by the gear 27 for producing reverse movement of the driven shaft 12.

When the gear 17 mounted on the driving shaft 11 is rotating at a different relative speed from the driven shaft 12 in order to cause them to rotate in unison so that the clutch pins may enter the recesses in the gear 17 to lock them together for direct drive I provide a friction disk 34 and mount the same upon the reduced ends of the pins 20 in the slots 18 in the driven shaft so that it may be moved into frictional contact with the gear 17 and the said gear 17 is preferably provided with a collar 17′ to provide a larger surface against which the disk may contact. In order to cause the driven shaft 12 and the gear 26 mounted upon the same to rotate in unison I provide a separate larger disk 35 and mount the same upon the opposite ends of the pins 20 so that it may be moved into engagement with the gear 26.

I provide means for moving the friction disks into engagement with their respective gears comprising a roller 36 mounted upon a crank pin 37 carried eccentrically by a stub shaft 38 to the outer end of which is secured by means of a pin 39 an operating arm 40 adapted to be rocked or oscillated for moving the roller and friction disks into engagement with either of the gears 17 or 26. Means (not shown) is associated with the operating arm forming it in either direction so that it will engage the respective friction disks. Said means may be manually operable or may be operable by a portion of the mechanism of the transmission.

In the operation of the device the clutching operation may be performed and if the proper speed relation between the respective parts is present such operation will be practically noiseless. If, however, the proper speed relation is not present, as will be the case upon changing from a higher to a lower gear ratio, or when coasting in neutral it becomes desirable to change to higher intermediate gears, it would be practically impossible to change the ratio of the gears without considerable noise or damage unless the parts were caused to operate at substantially the same rotative speeds. With my device the associated parts are caused to rotate at the same rotative speeds by swinging the roller into engagement with the proper disk which is rotating with the shaft and when said disk engages its respective gear which is rotating independently of the shaft the gear will be caused to rotate at the same speed as the disk and shaft and the clutching operation may be easily and noiselessly accomplished.

It will be obvious to those skilled in the art that various changes may be made in my device without departing from the spirit of the invention and therefore I do not limit myself to what is shown in the drawings and described in the specification but only as indicated in the appended claim.

Having thus fully described my said invention, what I claim as new and desire to secure by Letters Patent, is:

A clutch adapted for use in variable speed transmissions for automobiles comprising a rotatable shaft having a plurality of longitudinally arranged slots therein, a transmission element loosely mounted on said shaft, clutch pins mounted in some of said slots in the shaft and slidable into position to clutch the transmission element to the shaft, a collar extending around said clutch pins and holding them in their respective slots, means for moving said collar to shift the clutch pins into engagement with the transmission element, a second set of pins disposed longitudinally on said shaft between said first-named clutch pins, a substantially flat friction clutch plate mounted on the ends of the last mentioned set of pins and slidable into engagement with said transmission element, means for pressing the friction clutch plate against the transmission element to cause the shaft and transmission element to rotate in unison to facilitate the clutching operation.

In witness whereof, I have hereunto set my hand at Washington, District of Columbia, this 24th day of June, A. D. nineteen hundred and twenty-six.

JOHN F. GAYLORD.